United States Patent [19]
Lupke

[11] Patent Number: 5,405,569
[45] Date of Patent: Apr. 11, 1995

[54] METHOD AND APPARATUS FOR FORMING A DOUBLE WALLED THERMOPLASTIC TUBE WITH INTEGRAL BELLS

[76] Inventor: Manfred A. A. Lupke, 10 McCleary Ct., Concord, Ontario, Canada, L4K 2Z3

[21] Appl. No.: 83,778

[22] Filed: Jun. 29, 1993

[51] Int. Cl.⁶ .............................................. B29C 49/04
[52] U.S. Cl. ........................... 264/504; 264/508; 264/511; 264/515; 264/156; 264/167; 264/173; 425/133.1; 425/290; 425/326.1; 425/532; 425/388; 425/393; 425/396
[58] Field of Search ............... 264/508, 506, 507, 504, 264/511, 568, 571, 515, 145, 155–156, 173, 167; 425/393, 396, 133.1, 462, 326.1, 290, 388, 532

[56] References Cited

U.S. PATENT DOCUMENTS

| | | | |
|---|---|---|---|
| 3,743,456 | 7/1973 | Cini | 425/133.1 |
| 3,976,414 | 8/1976 | Hegler et al. | 425/131.1 |
| 3,996,323 | 12/1976 | Hegler et al. | 425/326.1 |
| 4,510,013 | 4/1985 | Lupke | 156/498 |
| 4,534,923 | 8/1985 | Lupke | 264/156 |
| 4,710,337 | 12/1987 | Nordström | 264/508 |
| 4,770,618 | 9/1988 | Lupke | 425/72.1 |
| 4,846,660 | 11/1989 | Drossbach | |
| 4,865,797 | 9/1989 | Järvenkylä | 264/508 |
| 4,873,048 | 10/1989 | Järvenkylä | 264/504 |
| 5,296,188 | 3/1994 | Lupke | 264/508 |

FOREIGN PATENT DOCUMENTS

| | | | |
|---|---|---|---|
| 0563575 | 2/1993 | European Pat. Off. | |
| 2264649 | 4/1974 | France | |
| 2409020 | 9/1975 | Germany | 264/508 |
| 61-148035 | 7/1986 | Japan | 264/508 |
| 61-242829 | 10/1986 | Japan | 264/508 |
| 61-261020 | 11/1986 | Japan | 264/508 |
| 8805377 | 7/1988 | WIPO | |
| 9014208 | 11/1990 | WIPO | |

Primary Examiner—Jeffery R. Thurlow

[57] ABSTRACT

A travelling mold tunnel for forming double walled corrugated tube has a first portion for forming corrugated tube and a second belled portion for forming a cuff portion suitable for coupling with another tube. At the upstream end of the belled portion, radial small diameter passages are provided so that a pressure differential may be set up between the inside and the outside of a first parison within the belled portion. Thus, vacuum may be applied through the radial passages to allow an inner parison to laminate with the first parison over its inner surface in the belled portion. The first parison is drawn into the passages in protruding balloons. These may be ruptured. Alternatively, positive pressure may be used. In this case, the balloons may be ruptured inwardly.

22 Claims, 5 Drawing Sheets

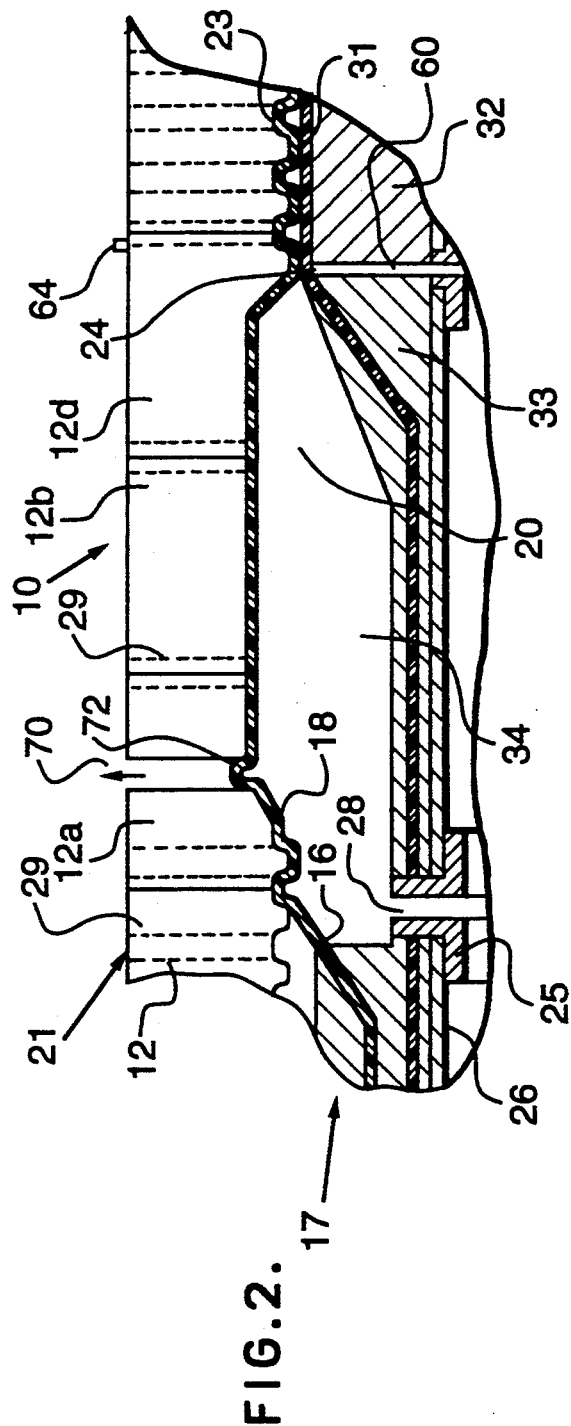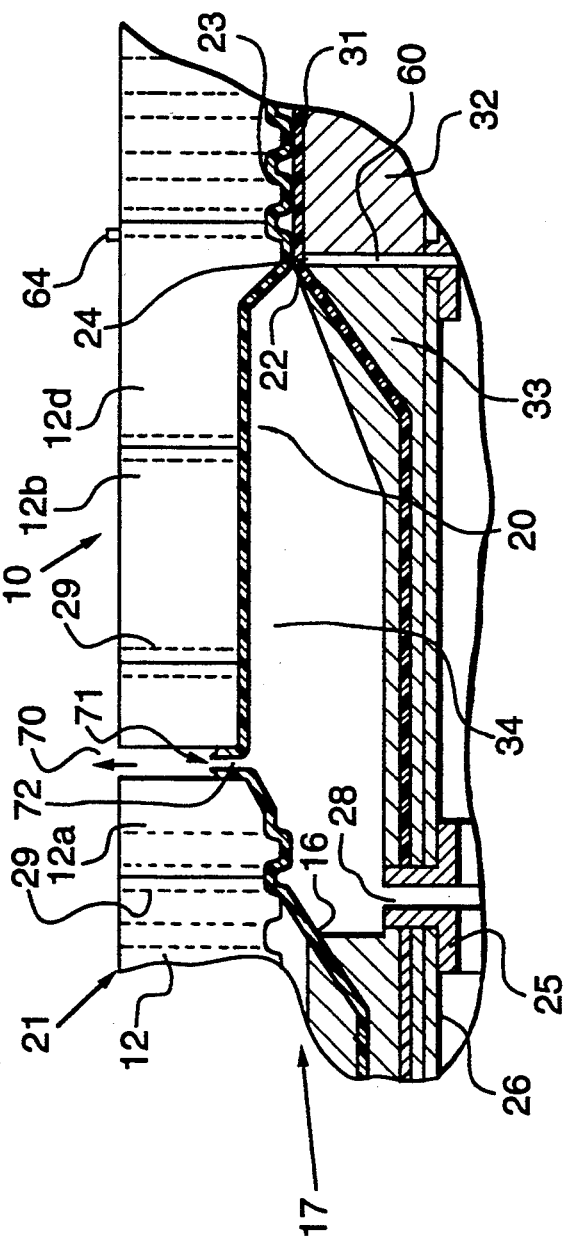

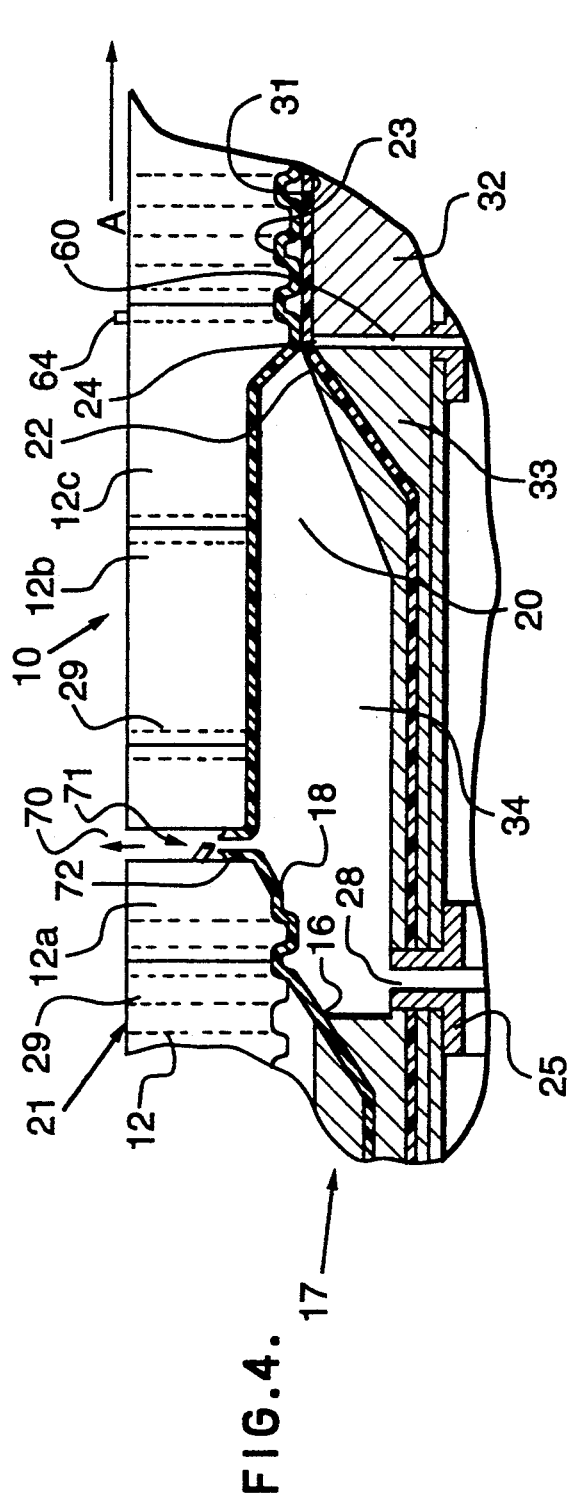
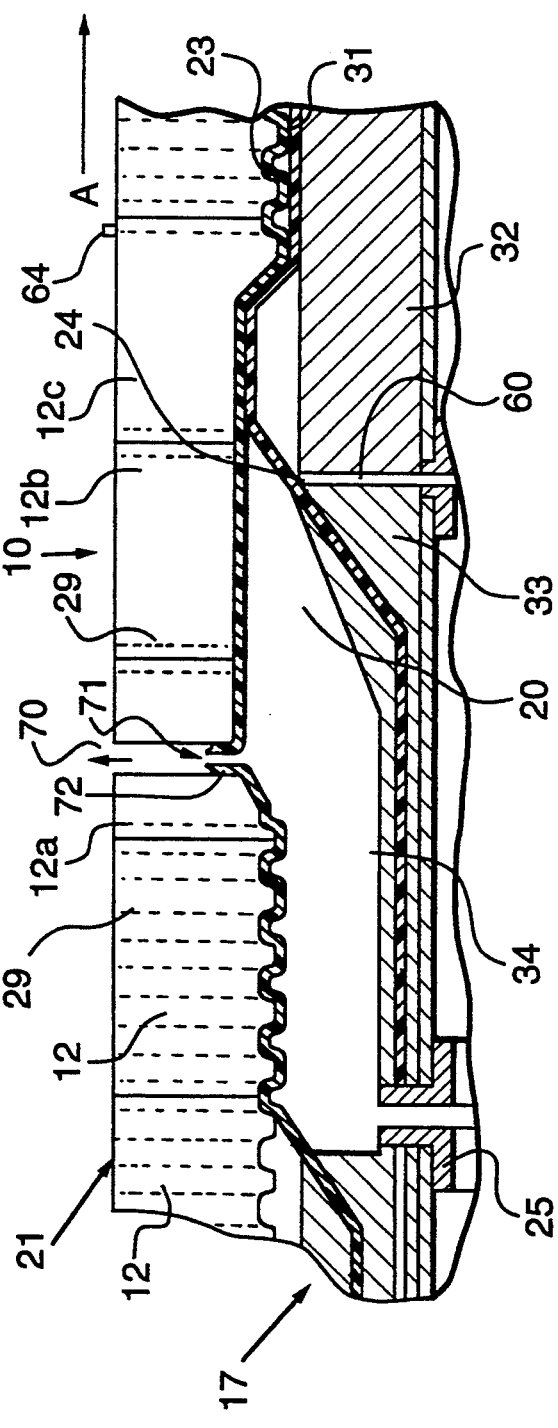
FIG. 4.
FIG. 5.

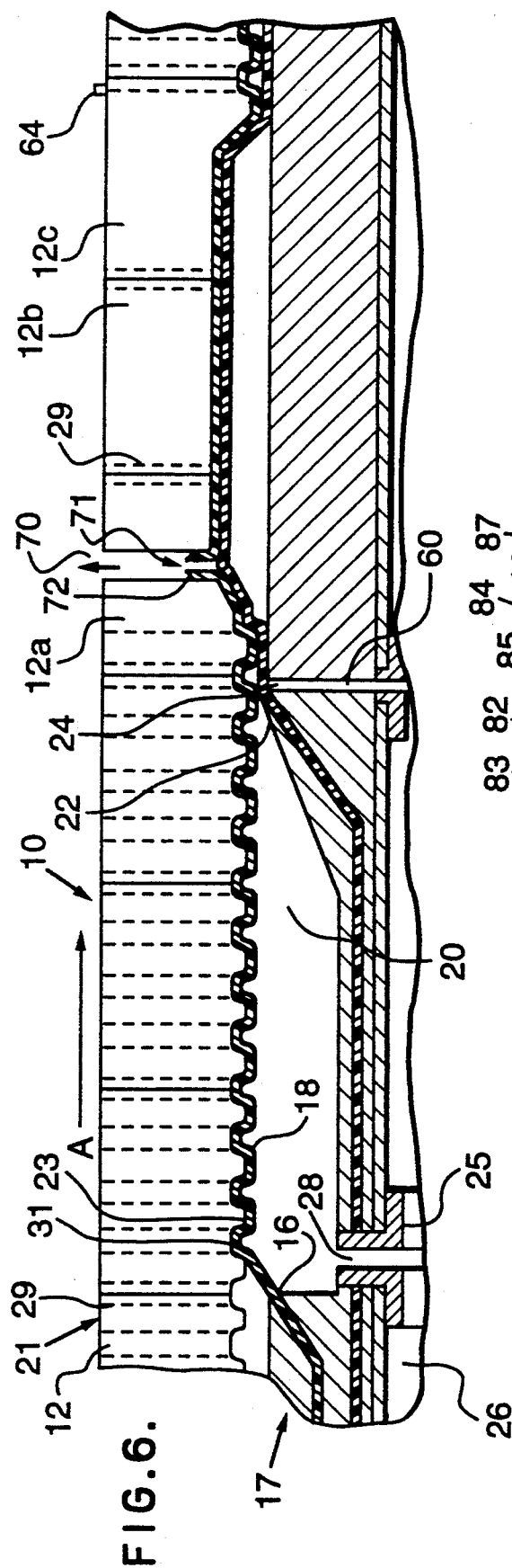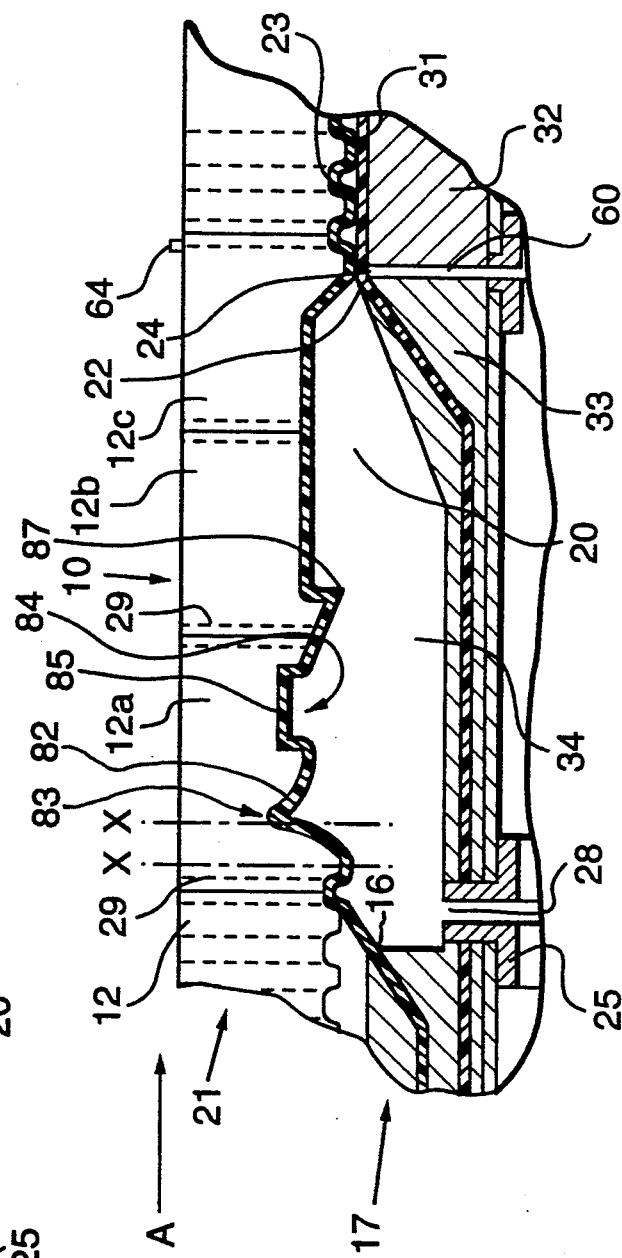

METHOD AND APPARATUS FOR FORMING A DOUBLE WALLED THERMOPLASTIC TUBE WITH INTEGRAL BELLS

FIELD OF THE INVENTION

This invention relates to a method and apparatus for forming double walled thermoplastic tube having a corrugated outer wall and a smooth inner wall and having integrally formed bell sections along its length.

BACKGROUND OF THE INVENTION

Double walled thermoplastic tube may be made an apparatus of the travelling mold tunnel type as disclosed, for example, in U.S. Pat. No. 4,226,580 issued Oct. 7, 1980 to Gerd P. H. Lupke and Manfred A. A. Lupke, U.S. Pat. No. 4,500,284 issued Feb. 19, 1985 to Manfred A. A. Lupke, U.S. Pat. No. 4,510,013 issued Apr. 9, 1985 to Manfred A. A. Lupke and Gerd P. H. Lupke, and U.S. Pat. No. 4,534,923 issued Aug. 13, 1985 to Manfred A. A. Lupke. Numerous other patents generally concern travelling mold type apparatus for forming double walled tube and numerous additional patents concern travelling mold type tunnels for formation of single walled tube and also of ribbed tube. The patents referred to are intended to be merely exemplary of the large number in the field.

Of the patents mentioned, however, U.S. Pat. No. 4,534,923 specifically concerns the formation of bells in the continuous production of double walled tube. It is necessary to form such bells along the length of tube for various reasons among which is the desirability of providing a smooth walled portion of tube at which portion the tube may be cut. The smooth walled (and portion of cut tube are suitable for interfacing with other tube or coupling to other unit. Where double walled tube is concerned, the provision of such bells has caused a problem. In the early days of utilization of such tube, bells were formed with a double skin and an air gap between the skins. After molding of the tube the inner skin was cut away. Such a procedure is described in U.S. Pat. No. 4,500,284. Later it was found possible to press the softened inner wall against the bell section molded into the outer wall to form a stronger bell comprising of both walls combined together. Such as system described and claimed in U.S. Pat. No. 4,534,923.

Nevertheless problems remained in accurately forming suitable bells without undue expense. For example, the complex mechanical arrangements required for pressing the inner tube against the outer tube bell section described in U.S. Pat. No. 4,534,923, were neither very inexpensive, nor were they maintenance free.

It has now been discovered that the inner tube may be forced against the outer bell sections by surprisingly simple means.

SUMMARY OF THE PRESENT INVENTION

According to the invention, there is provided a method of forming double walled pipe of thermoplastics material by extruding a first parison into a travelling mold tunnel, comprising a tubular mold surface having a first portion having corrugations extending therearound for molding corrugated tube, and a second portion which is belled with respect to said first portion for molding a cuff portion of the tube; the method comprising extruding a first outer parison of molten thermoplastics material from a first extrusion orifice into the mold tunnel; biassing the first outer parison against the respective first and second portion to form respectively a corrugated tube section having troughs and crests therearound and a belled tube section; applying a pressure differential between the inner and outer surfaces of the first outer parison at a number of points about the circumference of an upstream region of the second portion to deform the first outer parison away from the second mold surface to form protruding balloons therefrom;

extruding a second inner parison of molten thermoplastics material from a second extrusion orifice downstream of the first extrusion orifice into the mold tunnel and into the first outer parison, biassing the second inner parison against troughs of the corrugated tube section lying against the first mold surface to form double walled tube and in to the belled tube section to form a laminate therewith.

The means for biassing the first outer parison against the first and second mold portions may be pneumatic pressure from inside the parison and/or vacuum pressure from outside, i.e. the outer parison may be subjected to either or both blow or vacuum molding.

Preferably, suction is applied from the exterior to create the pressure differential to form the protuberances. Such suction may be applied through radial passages which open at the outer surface of the parison. Thus, the orifice of each passage bounds a small area of the parison to concentrate the suction at that area and to draw the protuberance into the passage. If a reverse pressure differential is to be applied, then positive pressure will be exerted through the passage. Again, the orifice of the passage bounds a discrete area on the outer surface of the parison and concentrates the pressure against that area. In this case, however, the protruding balloon will be blown towards the inside of the bell cavity.

The balloons may be ruptured either by the suction or positive pressure alone, or, when the protuberances are drawn into the passages under suction, by a suitably sharp projection in the passage. Such projection might be a needle or a knife.

The holes made by rupturing protuberances should be very small and only sufficient to allow the escape of gas pressure from between the inner and outer parisons when the inner parison is later applied. The holes formed in this way may, for example, be as small as from 0.01 to 2 mm depending upon the wall thickness.

The second inner parison may be biassed respectively against the troughs of the corrugated tube section or against the belled tube section by pneumatic pressure or by similar means to those disclosed in U.S. Pat. No. 4,534,923 previously referred to.

The second mold portion may be shaped to flare into a larger diameter bell section at the upstream end. The second mold surface may also, or alternatively, include a circumferential recess to complement an inner circumferential groove in the bell section. The second mold portion may also or alternatively include an inwardly projecting circumferential ridge to form a complementary inward projection in the belled section. The invention also includes apparatus for carrying out the invention.

BRIEF DESCRIPTION OF THE DRAWINGS

Embodiments of the invention will now be described by way of example with reference to the drawings, in which:

FIG. 2 is an enlarged section of a detail of the apparatus of FIG. 1;

FIG. 3 is an enlarged detail of one embodiment of a protuberance forming passage of FIG. 1;

FIG. 4 is a detail of another embodiment of the protuberance forming passage of FIG. 1;

FIG. 5 is a similar section to that of FIG. 2 but showing the mold tunnel slightly advanced;

FIG. 6 is a similar section to that of FIG. 5 with the mold tunnel still further advanced;

FIG. 7 shows a section of another belled portion of the mold tunnel; and

Figure 1:
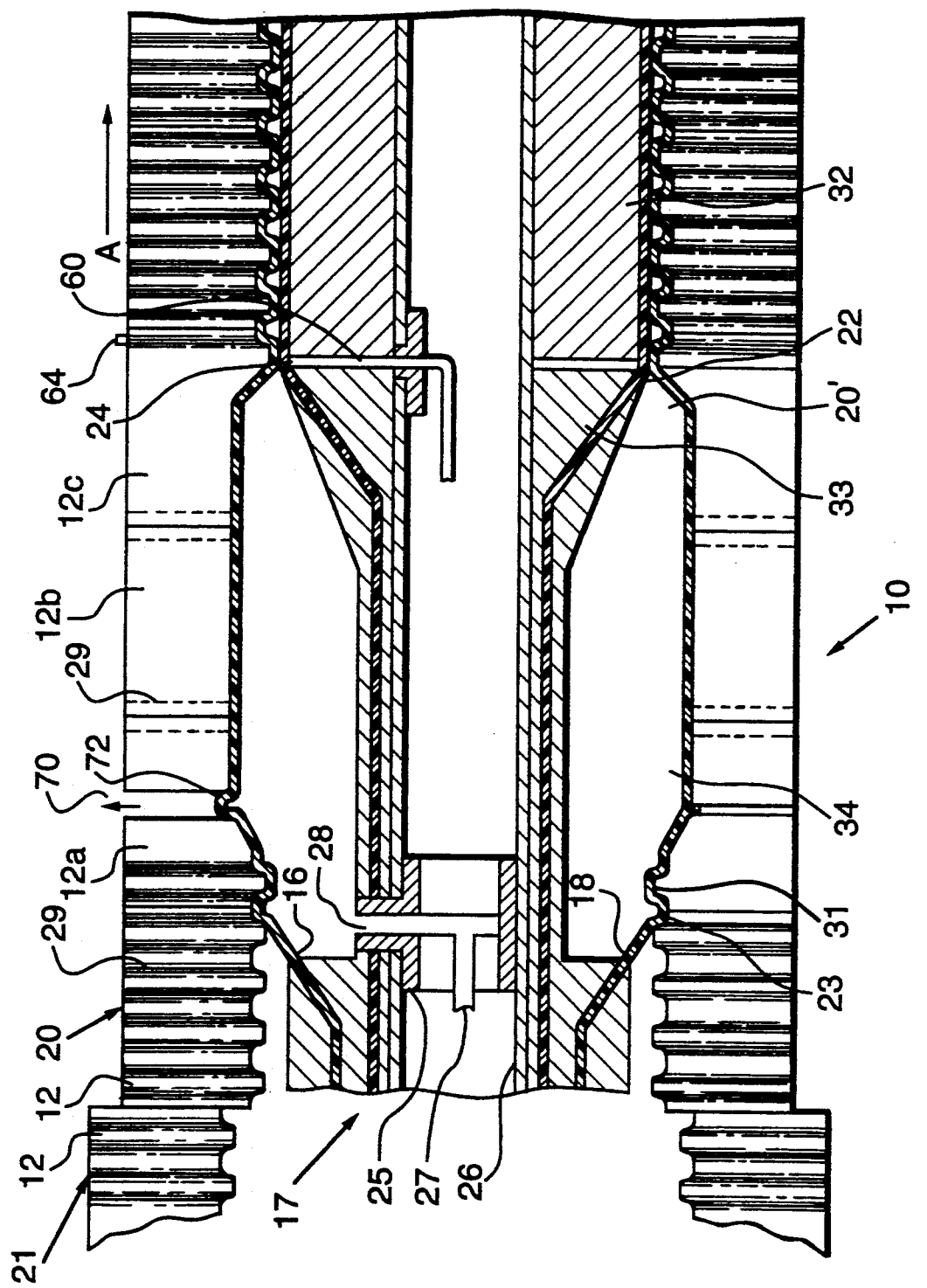
FIG. 1 is a rough simplified longitudinal section of apparatus for forming a double walled plastic tube, including a bell forming section according to the invention.

DETAILED DESCRIPTION ACCORDING TO THE PREFERRED EMBODIMENTS OF THE PRESENT INVENTION

Referring to the drawings, the illustrated apparatus includes a travelling mold 10 advancing in the direction of arrow A. In this embodiment, the mold consists of two sets of mold blocks 12, circulating on respective paths as described, for example, in the previously referred to Canadian Patent No. 1,083,766. This type of mold is not essential, however, and other embodiments of the invention may employ other forms of travelling mold tunnel.

The mold 10 is associated with an extrusion die having an elongate nozzle 17 with an upstream annular orifice 16 for extruding a first, outer parison 18 into the mold cavity 20 of the mold which comprises a corrugated mold cavity 21 and a belled mold cavity 34. The nozzle 17 has an additional downstream orifice 22 for extruding a second, inner parison 24 into the outer tube molded from the first parison.

The die is also provided with a central core pipe 26. Pressurized air may be supplied through a pipe 27 running along the core pipe 26 and radial passages 28 inside the outer tube 18 upstream of the downstream die orifice 22. This pressurized air serves to blow mold the outer tube into the mold cavity 20 to mold it in crests 23 and troughs 31 in mold cavity 21 and into mold cavity 34.

Downstream of orifice 22, the core pipe 26 carries a cooling plug 32 having a cooled outer surface. The cooling plug 32 presses the inner parison 24 against the corrugated outer parison 18 to fuse the tubes into a double walled pipe with a corrugated outer wall and a smooth inner wall in the mold cavity 21.

At selected points along the travelling mold, the mold blocks 12a, 12b and 12c are shaped to form the outer wall into the belled mold cavity 34. The outer parison 18 is molded into this bell section by blow molding, utilizing pneumatic pressure through radial passages 28 from pipe 27 within core pipe 26 by means of a spider 25. Alternatively, or additionally vacuum molding may be applied through passages 29 in mold blocks 12.

At an upstream region of bell section 34 a number of small diameter passages 70 are provided around the circumference of the mold to apply differential pressure between the interior and the exterior of outer tube wall 18 at a point where it is still soft or where it is heated to soften it. Suction may be applied through passages 70 to form small protruding balloons 72 of parison 18 into each passage 70. These are ruptured to release pressure from within outer tube wall 18. (See FIG. 3.) The actual orifice 71 may be located at the surface of outer tube wall 18 so as to concentrate suction over an area of parison equivalent to the area of the orifice 71.

It is of course possible to utilize high pressure in passages 70 to project a small balloon inwardly into bell section 34.

Protruding balloons 72 are ruptured either solely by differential pressure between the inside of bell section 34 and the outside of bell section 34, or the rupture is aided by the presence of a sharp projection 80 within channel 70. Such a projection may be a needle or knife (see, for example, FIG. 4). The use of an aid such as the needle or knife 80 may be only possible when the protruding balloon 72 is drawn into channel 70 under suction. If it is forced into bell section 34, it may be necessary to rupture it using air pressure alone.

Inner parison wall 24 may be biassed against the apices of troughs 31 by means of the supply of pressurized air to the interior of inner tube wall 24 through radial passage 60. Passage 60 may be located just downstream of downstream orifice 22 so that it acts on inner parison 24 while it is still soft and is able to bond with the troughs 31 of outer tube wall formed from parison 18.

Radial passage 60 may be formed by a small gap between cooling plug 32 and nose cone 33 therefor. This small gap 60 between the cooling plug 32 and the nose cone may be very small, say for example the gap may be around 10 thousandths of an inch. Continued travel of the travelling mold in the direction of arrow A causes the inner tube formed from inner parison 24 to travel over the surface of cooling plug 32 in contact with the apices of troughs 31 to form double walled corrugated tube with the corrugated outer tube formed from parison 18.

When a belled section 34 of mold passes the orifice 22, the pneumatic pressure from pipe 60 tends to bias inner parison 24, outwardly. Suction through passages 70 through the protruding ruptured balloons 72 in the outer parison 18 at least removes gas resistance to such outward bias from within belled section 34. The suction through passages 70 may also positively enhance the outward bias on inner tube wall 24.

The sequence of operations may be seen in FIGS. 2 to 6. FIG. 2 shows inner wall 24 biassed against troughs 31 by pneumatic pressure from passage 60. There may be little or no tendency for the inner wall 24 to enter the corrugations due to air entrapped therein.

FIGS. 3 and 4 show an enlarged detail of the wall of the parison being ballooned into the channels 70. The area of the ballooning is confined by the mouth or orifice 71 of each channel 70 and, thus, the protruding balloon may be shaped as a finger or cylinder. In FIG. 3 the balloon is shown rupturing under gas pressure alone but, as shown in FIG. 4, the projection 80 is provided to aid the rupture. Again, it is emphasized that pressure may be used instead of suction so that the protrusion is in the opposite direction. In this case, although the area of the parison wall which is ballooned will be confined by the mouth or orifice 71 or channel 70, the protrusion itself may not be so finger shaped but may be more generally bulbous.

The use of knife 80 or other sharp, pointed instrument may serve to control the size of the eventual rupture. This may be important, since the size of rupture should only be sufficient to allow the escape of gas from bell section 34 but should not be big enough to affect the strength of the tube or, indeed, affect its physical properties or aesthetic appearance detrimentally.

FIG. 5 shows the mold tunnel advanced in the direction of arrow A so that the central part of belled section 34 is generally coincident with nozzle orifice 22 for inner wall 24. The inner wall parison 24 may be seen pushed into mold cavity 34 to be against outer tube wall formed from parison 18. The inner tube wall is still soft and laminates with the outer wall to form a cuff or coupling part 80 of the eventual tube (see FIG. 8). Gas from within mold cavity 34 escapes through ruptured balloons 72 of the outer wall formed from parison 18.

FIG. 6 shows the mold tunnel even further advanced so that the inner wall has closed balloons 72 from the inside and no further gas escape therethrough is possible. Inner parison 24 will, as the next corrugated section advances, lose its tendency to conform to the mold surface and will bond with the trough 31 of the corrugations.

Figure 8:
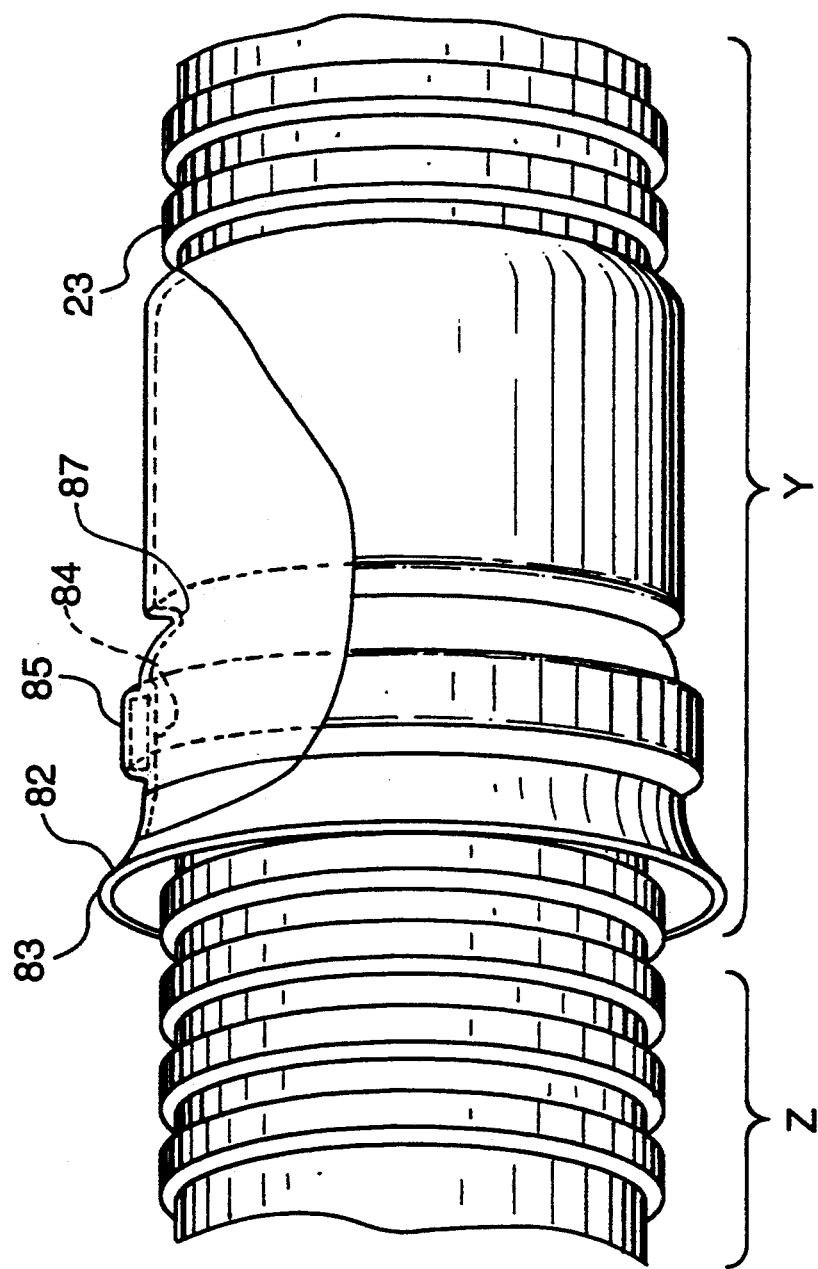
FIG. 8 is an illustrative view of a pipe coupling formed by a process or apparatus according to the invention.

FIG. 7 shows a modified mold cavity 34 having mold surfaces to enhance features of the eventual coupling or cuff of tube to be formed. Thus, the mold cavity 34 of FIG. 7 includes an outwardly flared portion 82 which forms an enlarged mouth 83 in the eventual coupling (see FIG. 8). In practice, the section of tube between broken lines X—X in FIG. 7 is cut away so that bracketed pipe portion Y forms a female coupling part at one end of a pipe and bracketed pipe portion Z forms a male coupling part for insertion into the female part as shown in FIG. 8. The enlarged mouth 83 due to flared portion 82 may facilitate entry of part Z into part Y.

An internal seating 85 for a seating O-ring may be provided by means of a groove 84 around the circumference of mold cavity 34. A suitable 0-ring seated in the resulting seating will extend around the part Z when inserted to seal it with part Y.

Means to prevent too easy separation of the assembled coupling may be provided by inwardly directed profiling of the mold cavity 34 to form an internally directed annular hook 87 of the resulting coupling. Hook 87 will extend inwardly and engage a crest 23 of the part Z as shown in FIG. 8.

The actual thickness of the coupling part Y may be influenced by speeding up or slowing down the speed of the travelling mold tunnel while mold cavity 34 is passing orifices 16 and 22. Thus a coupling of considerable strength and thickness may be produced.

In the corrugated section 21 the inner wall extends smoothly within the outer wall and only contacts the outer corrugated wall at the apices of troughs 31. Thus it is not necessary to bias the inner wall to mold into the corrugations and therefore it is not necessary to allow for such egress of air from the corrugations that the inner wall will mold into the troughs. It is, however, necessary to insure that the pressure within the sealed corrugations between the inner and outer walls is not such as to collapse the corrugations once the final tube has cooled. It may be possible to adjust the suction in channels 29 and to provide a sharp needles arranged in channels 29 to puncture the apex of each crest 23 of the corrugation. Such punctures may allow for ingress of air to equalize pressure in the corrugations. Such punctures may be very small indeed, and at least probably, smaller than the ruptures of balloons 72.

Embodiments of the invention in which exclusive property and privilege is claimed are as follows:

1. A method of forming double walled pipe of thermoplastics material by extruding a first parison into a travelling mold tunnel, comprising a tubular, corrugated mold surface having a first portion having corrugations extending therearound for molding corrugated tube, and a second portion which is belled with respect to said mold surface for molding a cuff portion of the tube; the method comprising extruding a first outer parison of molten thermoplastics material from a first extrusion orifice into the mold tunnel;

biassing the first outer parison against the respective first and second mold surfaces to form respectively a corrugated tube section having troughs and crests therearound and a belled tube section;

applying a pressure differential between the inner and outer surfaces and acting radially of the first parison at a number of points through wall openings in the mold tunnel about the circumference of an upstream region of the second portion to deform the first outer parison away from the second mold tunnel and producing small holes through the first parison;

extruding a second inner parison of molten thermoplastics material from a second extrusion orifice downstream of the first extrusion orifice into the mold tunnel and into the first outer parison; and biassing without producing holes in the second inner parison against troughs of the corrugated tube section lying against the first mold surface to form double walled tube, and into the belled tube section to form a solid laminate therewith.

2. A method as claimed in claim 1 which protruding balloons formed and ruptured to form the small holes in the first parison.

3. A method as claimed in claim 2 in which biassing pneumatic pressure is provided for biassing the first outer parison against the first and second mold surfaces.

4. A method as claimed in claim 3 in which the biassing pneumatic pressure is positive pressure acting on an inner wall of the parison.

5. A method as claimed in claim 3 in which the biassing pneumatic pressure comprises suction applied through said wall openings to act on the outer wall of he parison.

6. A method as claimed in claim 2 in which deforming suction is applied from the exterior of the parison to provide the pressure differential.

7. A method as claimed in claim 6 in which mechanical rupturing means are provided to aid in producing the small holes through said outer parison.

8. A method as claimed in claim 7 in which the mechanical rupturing means is a knife.

9. A method as claimed in claim 2 in which the second inner parison is biassed against respectively against the troughs of the corrugated tube section and against the belled tube section by pneumatic pressure.

10. A method as claimed in claim 2 in which the second mold surface is shaped to flare into a larger diameter bell section at the upstream end.

11. A method as claimed in claim 2 in which the second mold surface includes a circumferential recess to form complementary an inner circumferential groove in the belled tube section.

12. A method as claimed in claim 2 in which the second mold portion includes an inwardly projecting circumferential ridge to form a complementary inward projection in the belled tube section.

13. A method as claimed in claim 2 in which crests of the corrugations are provided with small punctures.

14. Apparatus for making double walled thermoplastics material pipe having at least one cuff section, the apparatus comprising;
   an extrusion die having an elongate extrusion nozzle of an extrusion die having first and second coaxial, extrusion channels;
   a travelling mold tunnel having a first tubular, corrugated mold portion having, corrugations extending therearound, and a second tubular mold portion which is belied with respect to said first mold surface said second section having wall or nines therethrough;
   a first extrusion orifice of the extrusion nozzle for delivering a first outer parison of molten thermoplastics material into the mold tunnel;
   biassing means for biassing the first outer parison against the respective first and second mold portions to form respectively a corrugated pipe section and a belled pipe section;
   a second extrusion orifice of the extrusion nozzle downstream of the first extrusion orifice for delivering a second inner parison of molten thermoplastics material into the first outer parison; and
   means for biassing the second inner parison against troughs of the corrugated tube section lying against the first mold surface to form double walled corrugated tube and into the belied tube section, and means which applies a pressure differential between inner and outer surfaces of the first parison through said wall openings about the circumference of an upstream region of the second mold portion to open small holes in the first outer parison without penetrating the second inner parison to form to solid laminate with the first outer parison.

15. Apparatus as claimed in claim 14 including additional mechanical rupturing means to assist in forming the small holes.

16. Apparatus as claimed in claim 15 in which means are provided to provide biassing pneumatic pressure for biassing the first outer parison against the first and second mold portions.

17. Apparatus as claimed in claim 15 in which means are provided to provide deforming suction which is applied from the exterior of the parison to provide the pressure differential.

18. Apparatus as claimed in claim 15 in which the mechanical rupturing means is a knife.

19. Apparatus as claimed in claim 15 in which the second mold portion is shaped to flare into a larger diameter bell section at the upstream end.

20. Apparatus as claimed in claim 15 in which the second mold portion includes a circumferential recess to form complementary an inner circumferential groove in the belled tube section.

21. Apparatus as claimed in claim 15 in which the second mold portion includes an inwardly projecting circumferential ridge to form a complementary inward projection in the belled tube section.

22. Apparatus as claimed in claim 15 including means to puncture the crests of corrugations of tube in the first mold portion.

* * * * *